G. ENRICO.
VEHICLE BRAKE.
APPLICATION FILED DEC. 10, 1906. RENEWED APR. 15, 1908.
903,068.
Patented Nov. 3, 1908.
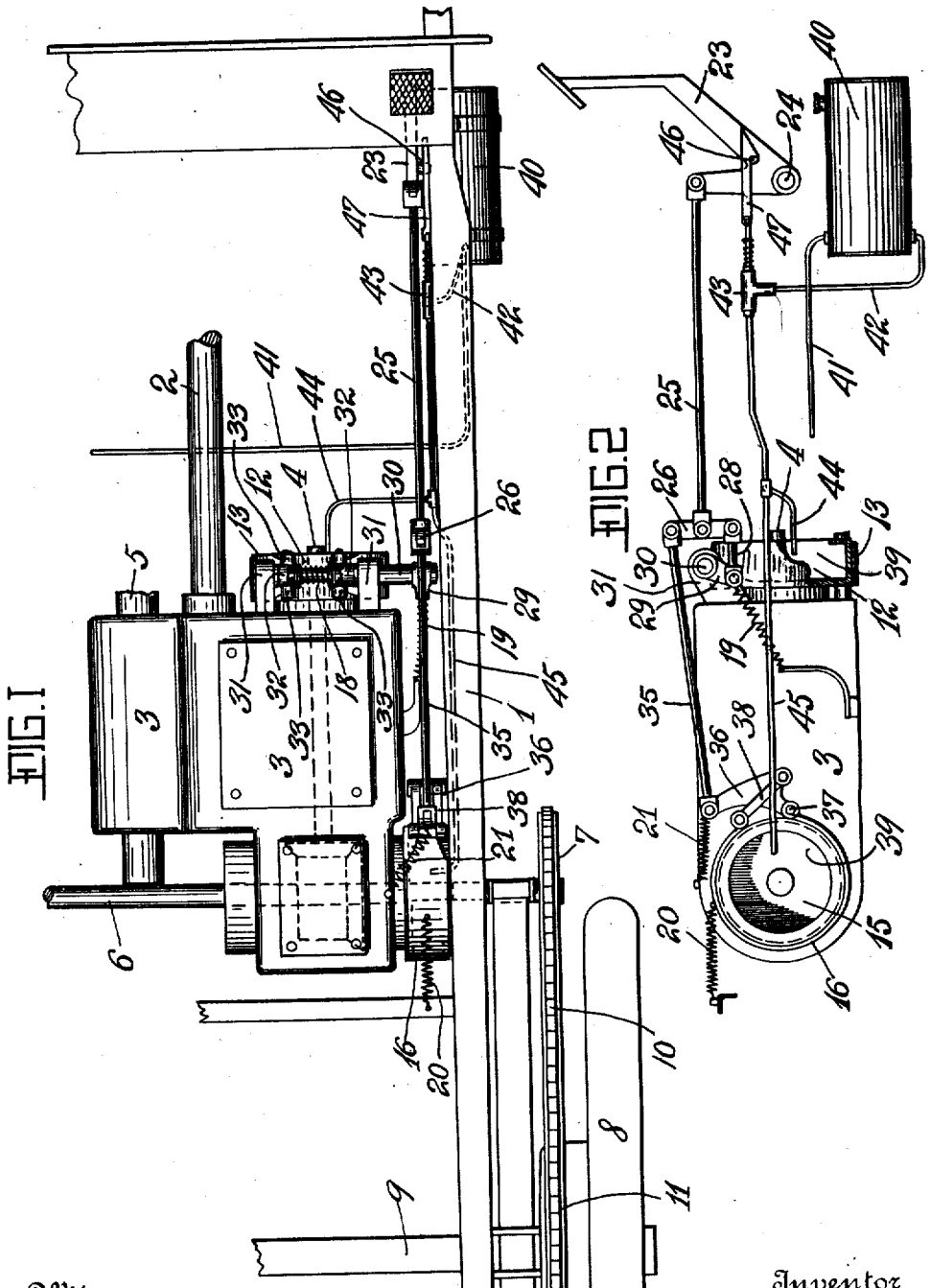
Witnesses
Geo. N. Kerr
Edmund O. Ruborg.
Inventor
Giovanni Enrico
By his Attorney
C. V. Edwards

UNITED STATES PATENT OFFICE.

GIOVANNI ENRICO, OF TURIN, ITALY, ASSIGNOR, BY MESNE ASSIGNMENTS, TO FIAT AUTOMOBILE COMPANY, A CORPORATION OF NEW YORK.

VEHICLE-BRAKE.

No. 903,068.  Specification of Letters Patent.  Patented Nov. 3, 1908.

Application filed December 10, 1906, Serial No. 347,043. Renewed April 15, 1908. Serial No. 427,212.

*To all whom it may concern:*

Be it known that I, GIOVANNI ENRICO, a subject of the King of Italy, residing at Turin, Italy, in the Province of Piedmont and State of Italy, have invented certain new and useful Improvements in Vehicle-Brakes, of which the following is a full, clear, and exact specification.

This invention relates to vehicle brakes, and more particularly has reference to improvements in equalizing mechanism for a plurality of brakes, and also to means for automatically supplying a cooling fluid to the friction surfaces in order to prevent overheating in case of prolonged application to the brakes.

The invention is illustrated herein in connection with a motor vehicle having two sets of brakes, one applied to the intermediate shaft and the other to the jack shaft, but the principles of the invention are applicable to other forms of mechanism as will more fully appear.

The objects of the invention are to provide a duplex brake mechanism applicable to a plurality of shafts and connected in such manner as to secure an even application of the brakes to all of the shafts.

A further object of the invention is to provide means for automatically supplying a determined quantity of cooling fluid to the brake surfaces whenever the brake is applied, together with improvements in the general construction and arrangement, as will appear more fully in connection with the description of the accompanying drawings, wherein Figure 1 is a plan view of portions of a vehicle embodying the invention; and Fig. 2 is a side view.

1 represents the frame of a vehicle having the engine shaft 2. gear box 3, intermediate shaft 4, gear shifter 5, shaft 4 being driven from shaft 2 at variable speeds by means of shifting gear connections, not shown. The shaft 4 is connected by means of a differential gear, also not shown, with a countershaft carrying one or more sprockets 7, from which the wheels 8 on axle 9 are driven, as by chain 10. On intermediate shaft 4 is a brake wheel 12, around which a brake band or shoe 13 passes, and on jack shaft 6 is a similar brake wheel 15 and brake shoe 16, springs 18, 19, and 20, 21, respectively being provided to hold the brake shoes normally out of engagement with the brake wheels.

In order to operate the brakes simultaneously and with equal force, equalizing lever connections are provided. 23 is a lever pivoted at 24, adapted to be operated by the foot of the driver, and connected by link 25 with a lever 26. From one end of the latter, a link 28 connects with an arm 29 on rock shaft 30, carried in lugs 31 attached to the gear case 3. The rock shaft 31 carries a pair of cams 32, 32, which engage lugs 33 carried by the ends of brake shoe 13. Whenever arm 29 is rocked towards the right, the shaft 30 will be rocked and the brake 13 applied. Connected from the other end of lever 26 is a link 35, which is connected to a lever 36 pivoted at 37 to brake band 16 and connected by link 38 to the other end of the brake band 16. Whenever lever 36 is rocked about 37, the link 38 takes up the band 16 and applies the brake. By pulling upon link 25, both brakes will thus be applied simultaneously, and any excess looseness of either brake will be taken up by equalizing lever 26 rocking in one direction or the other on its connection with link 25, so that the first action is to take up the slack in both brakes and then apply them equally on both shafts. By this mechanism, two shafts at right angles to each other can be simultaneously braked in equal degree, though the same equalizing devices can be used in connection with parallel shafts. Each brake wheel is provided with an interior channel 39 adapted to contain water, and means is provided whereby, at each actuation of the brake lever 23, a quantity of water is automatically supplied to these channels, thereby preventing overheating.

40 is a tank adapted to contain a supply of water under pressure.

42 is a discharge pipe, having a valve 43, and having branch pipes 44, 45, leading to the channels 39.

46 is a pin carried by lever 23 and 47 is a latch connected with the stem of valve 43. Normally the parts are as shown, with valve 43 closed and pin 46 in front of latch 47. When lever 23 is moved, the latch 47 opens valve 43 until pin 46 rides off the latch, whereupon the latch is withdrawn and the valve automatically closed by a spring. If desired, a cam can be provided to positively lift the latch to permit the valve to shut. While the valve is momentarily open the water is forced from the tank and discharged on the brake wheels, thus keeping the friction surfaces cool, and being distributed by the centrifugal movement. On the return movement of lever 23, the pin 46 rides under latch 47 in position to open the valve on the next actuation of lever 23. The pressure in tank 40 is maintained through pipe 41 by a pump, or by the engine exhaust, and additional water can be supplied whenever necessary. The quantity of water supplied will be controlled by the time the valve 43 is open, which will as before stated close automatically so that the water will not be wasted because the brake remains on a considerable time, and the amount can be controlled by adjusting the spring which closes the valve. Also the excess water in the channels can spill over, without damage. It will be understood that the invention is applicable to other forms of driving gear than that shown herein, without departing from the scope thereof.

Having thus described my invention, I declare that what I claim as new and desire to secure by Letters Patent, is,—

1. In a vehicle brake mechanism, the combination with a brake member having a friction surface, of a fluid reservoir, brake applying connections, and means whereby an actuation of said brake connections permits the discharge of a quantity of fluid from said reservoir to cool said brake and automatically cuts off the flow, substantially as described.

2. In a vehicle brake mechanism, the combination with a brake member having a friction surface, a reservoir adapted to contain a supply of fluid under pressure, brake applying connections, and means whereby an actuation of said brake connections permits the discharge by pressure of a quantity of fluid from said reservoir to cool said brake and automatically cuts off the flow, substantially as described.

3. In a vehicle brake mechanism, the combination with a shaft and a brake mechanism, and manually controlled actuating connections, of a fluid supply, a valve controlling the fluid supply, and connections between said valve and the brake actuating means to open the valve when the brake is applied, and means for closing the valve without releasing the brake substantially as described.

4. In a vehicle brake mechanism, the combination with a shaft and a brake mechanism, and manually controlled actuating connections, of a liquid supply, means for maintaining pressure thereon, a controlling valve, means for opening the valve during the applying movement of the brake, and means for closing the valve without releasing the brake, substantially as described.

5. In a vehicle brake mechanism, the combination with a shaft and a brake mechanism, and manually controlled actuating connections, of a fluid supply, means for maintaining pressure thereon, a controlling valve, means for opening the valve during the applying movement of the brake, and means for automatically closing the valve, substantially as described.

6. In a vehicle brake mechanism, the combination with a brake wheel having an annular channel, and a friction surface adjacent thereto, and a brake, of a fluid supply, fluid connections leading to said channel, a valve therein, means for opening the valve when the brake is applied, and means for automatically closing the valve when a certain movement has taken place, substantially as described.

7. In a brake mechanism for vehicles, the combination with a brake and actuating connections, of means controlled by the brake actuating connections for supplying a quantity of cooling fluid to one brake member simultaneously with the application of the brake, and means cutting off the supply of cooling fluid independently of the release of the brake.

8. The combination, in a vehicle, with a gear casing, containing a driving and a driven shaft, adapted to be geared together, of a brake mechanism adapted to be applied to one of said shafts, actuating connections therefor mounted on said casing, a transverse shaft geared to said driven shaft, a brake therefor, and equalizing connections for applying said brakes simultaneously, substantially as described.

9. The combination, in a vehicle, with a gear casing, containing a driving and a driven shaft, adapted to be geared together, of a brake mechanism adapted to be applied to one of said shafts, actuating connections therefor mounted on said casing, a transverse shaft mounted in said casing and geared to said driven shaft, a brake therefor having actuating connections mounted on said casing, and equalizing connections for applying said brakes simultaneously, substantially as described.

10. In a brake mechanism, the combination with a brake wheel, of a brake band adapted to be applied thereto, means for applying said brake band comprising a bell crank lever connected at one end and at an intermediate portion to the respective ends of said brake band, actuating means connected with the other end of said lever, and means controlled by said actuating means for supplying cooling fluid to said brake wheel and for automatically cutting off the flow, substantially as described.

11. In a vehicle, the combination with a plurality of brakes, of a source of liquid under pressure and connected with each of said brakes, and a single valve controlling the admission of fluid to both brakes, substantially as described.

12. The combination with a brake wheel and a brake therefor, of manually actuated means for applying the brake, a liquid reservoir having means for discharging fluid to cool said brake, a valve adapted to be opened by movement of the brake actuating means in one direction, and means for closing said valve without affecting the brake applying means, substantially as described.

13. The combination with a brake wheel and a brake therefor, of manually actuated means for applying the brake, a liquid reservoir having means for discharging fluid to cool said brake, a valve adapted to be opened by movement of the brake actuating means in one direction, means for closing said valve without affecting the brake applying means, and means permitting return of the brake applying means independently of the valve to restore the valve actuating connection, substantially as described.

In testimony whereof I affix my signature, in presence of two witnesses.

GIOVANNI ENRICO.

Witnesses:
C. HANGMAN,
JOSEPH FORNAS.